United States Patent [19]

Gunnell

[11] 4,099,899
[45] Jul. 11, 1978

[54] CARBON BLACK PELLETER

[75] Inventor: Thomas J. Gunnell, Bartlesville, Okla.

[73] Assignee: Phillips Petroleum Company, Bartlesville, Okla.

[21] Appl. No.: 700,435

[22] Filed: Jun. 28, 1976

[51] Int. Cl.² .................................... B29C 23/00
[52] U.S. Cl. .................................. 425/222; 23/259.5; 264/117; 366/289
[58] Field of Search ............... 259/102, 111, 112, 113, 259/DIG. 22, 5, 21, 27, 40, 47; 425/222; 264/117; 23/252, 259.5, 259.7; 241/186.1, 185 A, 185 R

[56] References Cited

U.S. PATENT DOCUMENTS

| 2,780,444 | 2/1957 | Hickey ................................ 259/113 |
| 2,898,094 | 8/1959 | O'Neill, Jr. ...................... 259/113 X |
| 3,776,529 | 12/1973 | Sutter et al. ..................... 259/113 X |

FOREIGN PATENT DOCUMENTS 1,156,386  10/1963   Fed. Rep. of Germany ......... 259/40

Primary Examiner—Robert L. Spicer, Jr.

[57] ABSTRACT

A longitudinal oscillatory motion is imparted to a rotating shaft of a carbon black pelleter. The movement of the rotating shaft in longitudinal direction varies the paths of the outer ends of the pins radially mounted on the shaft and traveling near the inner wall of the pelleter chamber thus preventing a buildup of carbon black cake on said wall.

5 Claims, 1 Drawing Figure

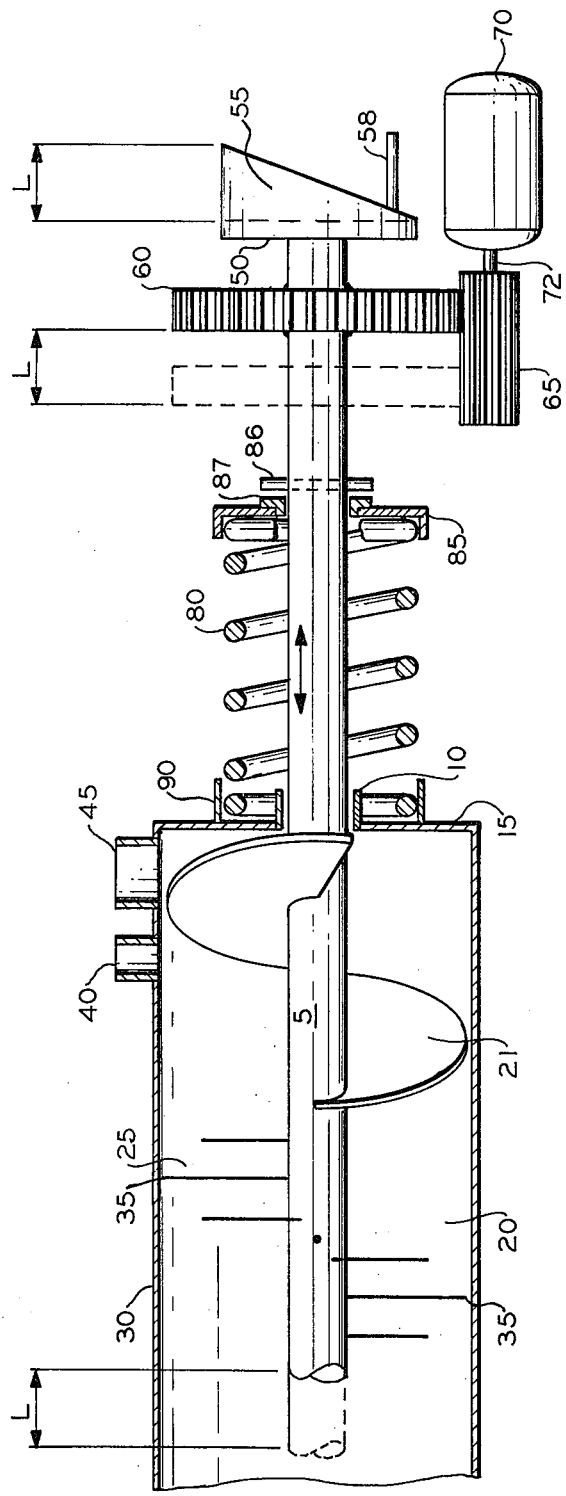

CARBON BLACK PELLETER

BACKGROUND OF THE INVENTION

This invention relates to a carbon black pelleter. In particular, it relates to a carbon black pelleter of the type having a shell and a rotating shaft with pins radially mounted thereon.

Carbon black produced in commercial operations is usually in the form of finely divided particles which, in order to facilitate its handling, transportation and to increase its bulk density, must be pelletized. The particles of finely divided carbon black and a pelletizing agent, such as water or hydrocarbon liquid, are introduced into a pelleter which usually includes a horizontal elongated cylindrical chamber and a shaft extending therethrough. The shaft has a radially mounted thereon pins which project radially outward and closely fit inside the chamber. The pins are usually arranged in a plurality of rows, each row forming a helical pattern around the shaft.

Generally, a wetting agent and carbon black are introduced at one end of the cylindrical chamber and as the shaft is rotated the pins coming in contact with wetted carbon black particles apply the necessary agglomerating forces to form pellets. The pellet carbon black is withdrawn at the other end of the pelleter chamber. The details of the operation of a conventional carbon black pelleter are well known in the art as disclosed, for example, in U.S. Pat. Nos. 2,306,698; 2,861,294; 3,825,233; and 3,579,717, which are incorporated herein by reference.

In such conventional operation carbon black accumulates in between the paths traveled by the outer ends of the pins. This necessitates intermittent cake removal and causes non-uniform size product as some of the cake dislodges between clean-ups and is carried out of the chamber with the product.

The present invention obviates some of the problems encountered in the prior art.

Thus, one object of the invention is to provide an improved method and apparatus for pelletizing finely divided carbon black.

Another object of the invention is to make the pelletizing of finely divided carbon black more efficient by eliminating the interruptions and expenses caused by the periodic removal of carbon black cake formed on the inner wall of the pelleter chamber, or, in continuous pelleting operations, minimizng the effect of cake buildup being dislodged and exiting with the properly formed pellet.

Still another object of the invention is to provide a process and apparatus which produces pellets having uniform, or at least narrow range, particle size and which does not contain substantially any large, irregularly shaped carbon black agglomerates.

A still further object of the invention is to eliminate or at least minimize the deposits of carbon black cake on the inner walls of the pelleter chamber.

Still another object of the invention is to make the operation of pelleting carbon black more efficient by eliminating the step of removing from the final product carbon black of irregular size carbon black cake formed as the result of dislodging of carbon black cake from the pelleter walls.

Other objects of the invention will become apparent to those skilled in the art upon studying this disclosure.

SUMMARY OF THE INVENTION

In accordance with one aspect of the invention a pelleter shaft extending through a chamber and having mounted thereon radially projecting pins oscillates in a longitudinal direction so that the ends of the pins travel along varied paths preventing carbon cake buildup that would otherwise form between adjacent paths on the inside of the chamber walls.

In accordance with another aspect of the invention the shaft of the pelleter is designed to oscillate at least a distance equal to the furthest spacing between adjacent pins.

In accordance with a further aspect of the invention the oscillation period is short enough to prevent buildup of carbon black cake deposited on the inside wall of the chamber before it is scraped off by the ends of the pins.

Other aspects of the invention will becme apparent to those skilled in the art studying this disclosure and the appended claims.

BRIEF DESCRIPTION OF THE DRAWING

The FIGURE shows a side elevational view of a portion of the pelleter.

DETAILED DESCRIPTION OF THE INVENTION

Oscillating or back and forth motion in axial direction is imparted to a pelleter shaft so that pins radially mounted on the shaft and extending outwardly toward the inside wall of the chamber of the pelleter provent buildup of carbon black cake. Without oscillations, carbon black cake would accumulate on the inside pelleter wall in the spaces between the areas faced by the tips of the rotating pins fitting closely inside the chamber.

The invention can best be described by referring to a preferred enbodiment thereof illustrated in the FIGURE. As depicted in the FIGURE, a rotable shaft 5 extends slidably through a bearing 10 mounted on the end wall 15 of the cylindrical chamber 20. The potion of the shaft 5 positioned coaxially inside the cylindrial chamber 20 has radially mounted thereon a series of pins 25 which extend radially toward the inside of a cylindrical wall 30 of the cylindrical chamber 20, the outer ends 35 of the pins 25 being only a slight distance from the wall. The pins 25, spaced from each other by a distance of no more than L, form a helical arrangement around the shaft 5. The cylindrical wall 30 has near the end wall 15, inlet 40 adapted to receive a pelleting liquid and a passageway 45 therethrough permitting carbon black to be charged into the cylindrical chamber 20. Feed auger 21 is affixed to shaft 5 at the inlet end of the cylinder chamber 20.

The shaft 5 extending on the other side of the bearing 10 has secured to its end 50 a flat side of a circular disc 55. The other side of the disc 55 is wedge-shaped and adapted to receive a retractable rod 58. A slight distance away from the disc there is secured to the shaft 5 a shaft gear 60 adopted to be driven by the motor gear 65 powered by motor 70 via motor shaft 72. The motor gear 65 is thicker than shaft gear 60 by at least L and mounted in such a position that the two gears mesh in any displacement of the shaft 5.

Farther toward the cylindrical chamber there is a spring 80 held in its co-axial position with rspect to the shaft 5 by means of retainer 85 and 90 mounted on the shaft 5 and the end wall 15 respectively. The inner end of the spring 80 is held in a fixed axial position by the end wall 15. The outer end of the spring 80 is held in a fixed position with respect to the shaft 5 by the retainer 85. The retainer 85 in turn is held in a fixed axial position by a pin 86. The shaft is permitted to rotate inside the retainer 85 on a bearing 87.

In operation, the motor 70 turns the motor shaft 72 which in turn rotates motor gear 65 and intermeshed therewith shaft gear 60. As the rotation of shaft gear 60 is transmitted to the shaft 5, pelleting liquid is introduced through inlet 40 and carbon black is charged through passageway 45 into the cylindrical chamber 20. The pins 25 coming in contact with wetted carbon black aggregate previously finely divided carbon black into pellets.

When the rod 58 is in a retracted position, the spring 80 pushing against spring retainer 85 holds the rotating shaft in the furthest position toward the disc end. The outer ends of the rotating pins 25 travel through the same circular paths, allowing some of the carbon black to deposit on the inner walls of the cylindrical chamber 20 in between those paths. Whenever it is determined that the deposits on the inner walls are becoming detrimental either to the operation of the system or to the quality of the final product, the retractable rod 58 is shifted to is extended position.

The operation is best described then by following in sequence the steps starting at the time when the retractable rod 58 is pushing against the thinnest portion of the wedge-shaped side of the disc 55. As the disc 55 rotates in order to accommodate increasing thickness of the wedge-shaped side of the disc 55 presses against rod 58 causing the shaft 5 to overcome the resistance of the spring 80 and slides toward the cylindrical chamber 20. As the rotating shaft 5 moves longitudinally, the gear 60 on the shaft 5 moves gradually in the same direction on the motor gear 65 which is made wider in order to accommodate the gear 60 in its displaced position. The movement of the shaft 5 causes a change in the path of the outer ends 35 of the pins so that the carbon black deposited in between paths when the retractable rod 58 is in retracted position is scraped off and buildup of cake is prevented. The shaft 5 reaches its maximum displacement L, equal to the difference in thickness of the wedge-shaped side of the circular disc 55, when the thickest portion of the wedge-shaped side of disc 55 reaches the fixed rod 58. As the thickness of the wedge-shaped edge becomes smaller, the spring 80, compressed by the retainer 85 againt end wall 15, causes the shaft 5 to move in the opposite direction; again the movement changes the paths traveled by the outer ends of the pins 25. The retractable rod 58 can be extended intermittently or in the alternative it can be retained in the extended position through the operation, thus preventing any buildup of carbon black cake.

The distance L is preferably at least equal to the furthest spaced adjacent pins so that the tips of the pins face off the entire inside of the chamber when the shaft is permitted to oscillate axially.

The amount of cake buildup can be further controlled by selecting the period of oscillation, i.e., the time required to move the shaft to a maximum displacement point and back, and the linear velocity of the outer ends 35 of pins 25.

Many modifications will occur to those skilled in the art upon studying this disclosure, including the preferred embodiment. Such modifications which are within the spirit of the invention are intended to be included within its scope.

I claim:

1. A carbon pelleter adapted to agglomerate particle carbon black introduced therein with a wetting agent, said pelleter comprising:
    (1) an elongated cylindrical chamber;
    (2) a rotating shaft extending through said chamber, said shaft having mounted thereon pins projecting radially outward and closely fitting inside the chamber; and
    (3) spring-loaded means actuated by a rotating disc for axially moving the rotating shaft back and forth during pelletizing operations so that the pins prevent formation of carbon deposits on the inside of the chamber.

2. A pelleter as claimed in claim 1 wherein said means comprises:
    a disc having a flat side and a wedge-shaped side secured by said flat side to the end of the rotatable shaft extending outside the chamber;
    a spring having an inner and an outer end co-axially positioned around the rotatable shaft between the disc and the chamber said inner end being held in a fixed axial position with respect to the chamber;
    a bearing retainer pin mounted on the shaft in a fixed axial position;
    a retainer mounted on the bearing, adapted to hold the spring in the co-axial position with respect to the shaft and to hold outer end of the spring in a fixed axial position with respect to the shaft; and
    a retractable rod positioned so as to press against the wedge-shaped side of the disc when in extended position, causing gradual shifting of the shaft toward the chamber as the thicker portions of the disc approach the retractable rod thereby causing compression of the spring, said shaft returning to its position by action of the compressed spring pushing against the retainer after the thickest point of the wedge-shaped disc by-passes the retractable rod.

3. A pelleter as claimed in claim 2 wherein the maximum difference in thickness of the wedge-shaped disc is at least equal to the maximum longitudinal spacing between adjacent pins mounted on the shaft.

4. A method for pelletizing carbon black in a pelleter having a chamber and a rotating shaft said shaft having pins radially mounted thereon which comprises:
    introducing carbon black together with a wetting agent into the pelleter; and
    axially oscillating the rotating shaft so that the pins prevent buildup of carbon black cake on the inside of the chamber.

5. A method for pelletizing carbon black as claimed in claim 4 wherein the maximum distance through which the rotating shaft oscillates is at least equal to the longitudinal axial distance between furthest spaced adjacent pins so that pins substantially prevent carbon black cake buildup on the inside of the chamber.

* * * * *

UNITED STATES PATENT AND TRADEMARK OFFICE
CERTIFICATE OF CORRECTION

PATENT NO. : 4,099,899
DATED : July 11, 1978
INVENTOR(S) : Thomas J. Gunnell

It is certified that error appears in the above-identified patent and that said Letters Patent are hereby corrected as shown below:

Column 4, lines 51-64, claims 4 and 5 should be cancelled.

Signed and Sealed this

Twelfth Day of February 1980

[SEAL]

Attest:

SIDNEY A. DIAMOND

Attesting Officer

Commissioner of Patents and Trademarks